United States Patent [19]

Murphy

[11] Patent Number: 5,095,845
[45] Date of Patent: Mar. 17, 1992

[54] EMERGENCY SIGNALING SYSTEM

[76] Inventor: Betty J. Murphy, 11015 Starwood Dr., Jacksonville, Fla. 32256

[21] Appl. No.: 736,610

[22] Filed: Jul. 26, 1991

[51] Int. Cl.$^5$ .............................................. B64B 1/50
[52] U.S. Cl. ............................. 116/210; 116/DIG. 9; 206/573; 206/803
[58] Field of Search .......................... 116/210, DIG. 9; 40/214; 141/19; 206/573, 803; 222/5; 244/33; 441/89, 92-94; 446/220, 224, 225

[56] References Cited

U.S. PATENT DOCUMENTS

| 2,395,006 | 2/1946 | Leslie | 116/210 X |
| 2,888,675 | 5/1959 | Pratt et al. | 244/33 X |
| 3,187,712 | 6/1965 | Pritchard et al. | 116/210 |
| 3,279,419 | 10/1966 | Demarco | 116/210 |
| 3,721,983 | 3/1973 | Sherer | 116/210 X |
| 3,809,288 | 5/1974 | Mackal | 222/5 |
| 4,114,561 | 9/1978 | Asaro | 116/210 |
| 4,240,371 | 12/1980 | Perry | 116/210 |
| 4,416,433 | 11/1983 | Bellina | 244/33 |
| 4,697,706 | 10/1987 | Schaller | 206/573 |

FOREIGN PATENT DOCUMENTS

| 2903384 | 9/1980 | Fed. Rep. of Germany | 116/210 |
| 3625812 | 2/1988 | Fed. Rep. of Germany | 441/89 |
| 2565931 | 12/1985 | France | 441/93 |
| 0584042 | 1/1977 | Switzerland | 116/210 |
| 0197810 | 10/1978 | United Kingdom | 116/210 |

Primary Examiner—William A. Cuchlinski, Jr.
Assistant Examiner—W. Morris Worth
Attorney, Agent, or Firm—Morton J. Rosenberg; David I. Klein

[57] ABSTRACT

An emergency signaling system (10) is provided for simultaneously reflecting electromagnetic energy in two distinct bandwidths of the electromagnetic spectrum. The inflatable bladder (20) includes a first portion (22,24) reflective of electromagnetic energy in a visual portion of the electromagnetic spectrum, and a second portion (30) being reflective of electromagnetic energy external the visual portion of the electromagnetic spectrum. Inflatable bladder (20) is depoyled by applying a pulling force to the lanyard cord (50) which triggers release of a lighter-than-air gas from a cartridge (90). The expansion of the inflatable bladder (20) causes the closure flap (62) of the storage case (61) to be unlatched from the front wall (67), allowing the inflated bladder to ascend therefrom. Inflatable bladder (20) is tethered to the storage case (60) by way of a cord (50), the cord (50) being unwound from the cord storage assembly (70) of storage case (60).

14 Claims, 2 Drawing Sheets

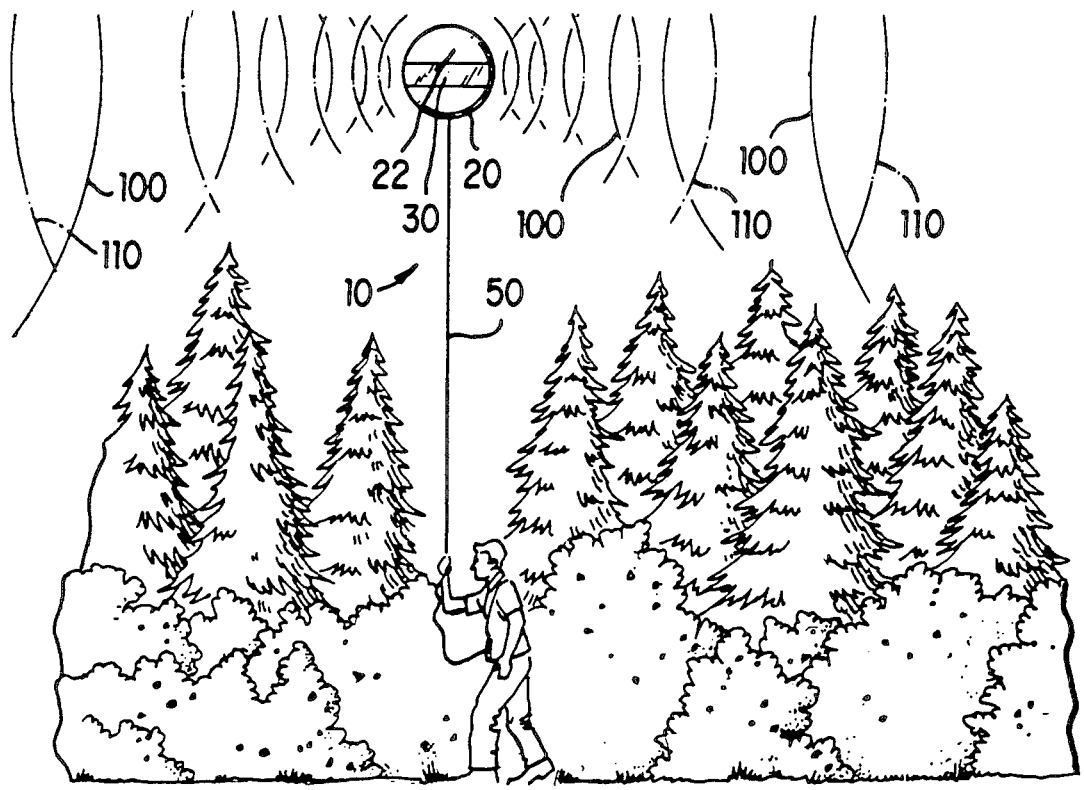
FIG. 1
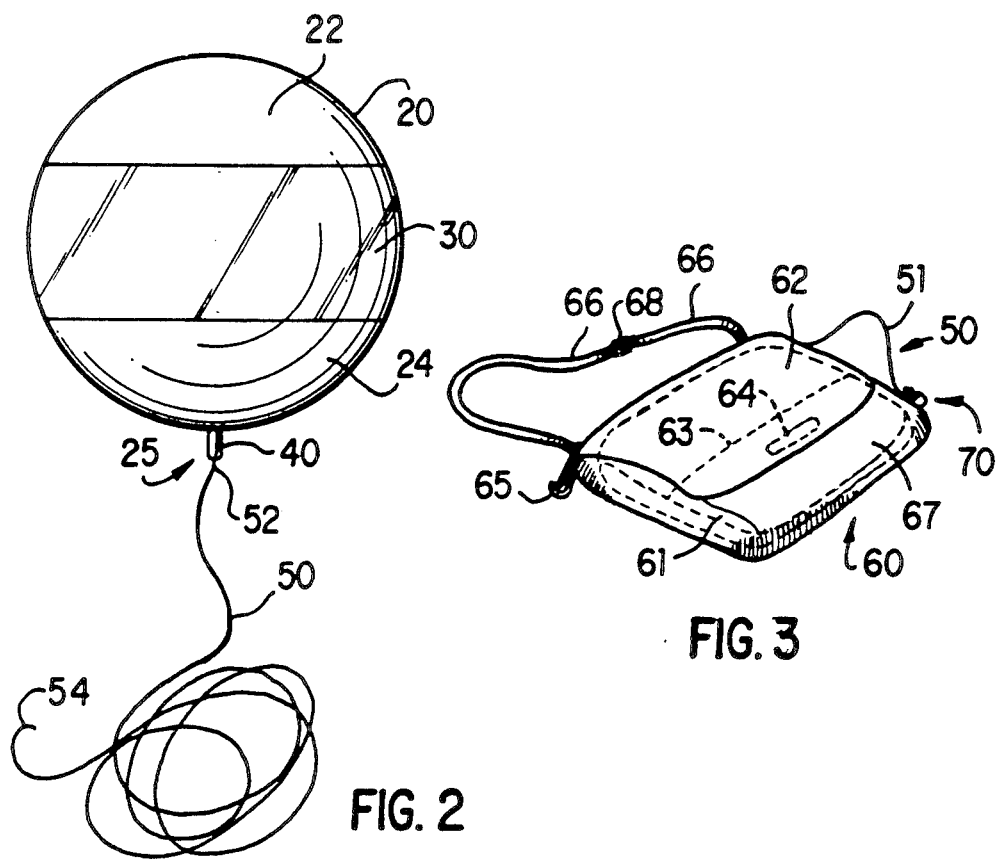
FIG. 2
FIG. 3 ized gas composition. The inflation

EMERGENCY SIGNALING SYSTEM

BACKGROUND OF THE INVENTION

1. Field of the Invention

This invention directs itself to emergency signaling systems which are manually activated. In particular, this invention directs itself to an inflatable bladder having a portion reflective of electromagnetic energy in one of two distinct bandwidths of the electromagnetic spectrum, and another portion reflective of electromagnetic energy in a different bandwidth of the electromagnetic spectrum. Further, this invention directs itself to a system where one of the bandwidths reflected is within a visual portion of the electromagnetic spectrum, while the other bandwidth is external the visual portion of the electromagnetic spectrum. More in particular, this invention pertains to an emergency signaling system wherein the inflatable bladder is released from its storage case responsive to the expansion of the bladder subsequent to release of a compressed gas composition. Further, the invention directs itself to an emergency signaling system where the inflated bladder is tethered by the cord utilized to actuate the release of the compressed gas. Still further, this invention is directed to a signaling system wherein the inflated bladder is self-deployed from a storage case which can be worn about the user's waist.

2. Prior Art

Signaling balloons are well known in the art, as are inflation systems which cause the release of a compressed gas responsive to the application of a pull force to a lanyard cord. However, such systems provide an inflatable bladder which is reflective of electromagnetic energy in just a single bandwidth of the electromagnetic spectrum. Such balloons typically are brightly colored so as to provide for high visibility, the balloons being reflective of electromagnetic energy in a visual portion of the electromagnetic spectrum. While large inflatable bladders, supplied from a sufficient source of compressed gas, may be capable of lofting a radiofrequency transmitter, such systems are large and bulky, and not well suited for use by the average hiker or sportsman.

In order to overcome the bulkiness of a system where radiofrequency signals can be utilized to locate an injured or lost person, the instant invention provides an inflatable bladder having a portion reflective of a visual portion of the electromagnetic spectrum and another portion reflective of electromagnetic energy outside the visual bandwidth, such as radiofrequency signals associated with radar systems. Thus, a small and compact assembly can be utilized as a rescue tool, the inflatable bladder having a reflective portion so as to be identifiable by a radar system, and thus utilized to locate the user of the device.

SUMMARY OF THE INVENTION

An emergency signaling system is provided. The emergency signaling system includes a reflective signal assembly for substantially simultaneously reflecting electromagnetic energy in two distinct bandwidths of the electromagnetic spectrum subsequent to inflation thereof. One of the two bandwidths reflected is within a visual portion of the electromagnetic spectrum, while the other is external the visual portion of the electromagnetic spectrum. The emergency signaling system further includes an assembly for inflating the reflective signal assembly to a predetermined volume with a gas composition having a density less than air. The inflation assembly is coupled to the reflective signal assembly and includes an actuator for releasing the gas composition responsive to a manual operation. The emergency signaling system also includes a storage assembly for housing the reflective signal assembly and the inflation assembly. The storage assembly includes a housing having a cavity therein for receiving both the reflective signal assembly and the inflation assembly. The housing includes a wall hingedly coupled to a rear wall of the housing for forming a closure for the cavity. The hinged wall interfaces with at least one flexible wall, the flexible wall being sufficiently pliant for the actuator assembly to extend external the housing from the cavity through the interface between the hinged wall and an adjacent wall.

BRIEF DESCRIPTION OF THE DRAWINGS

FIG. 1 is a depiction of the emergency signaling system in use;

FIG. 2 is a depiction of the signal balloon in an inflated condition;

FIG. 3 is a perspective view of the storage case for the signaling balloon;

DESCRIPTION OF THE PREFERRED EMBODIMENTS

Figure 4:
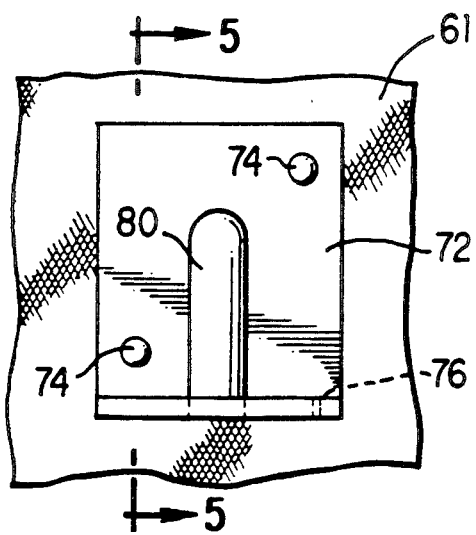
FIG. 4 is a sectional plane view of the cord storage assembly of the case of FIG. 3.
Figure 5:
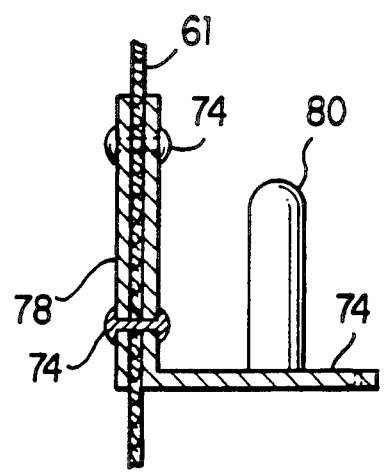
FIG. 5 is a cross-sectional view of the cord storage assembly as shown in FIG. 4.

Referring now to FIGS. 1-7, there is shown emergency signaling system 10 for providing a system which is easily activated in emergency situations for indicating the location of a person requiring rescue. As will be seen in following paragraphs, emergency signaling system 10 is specifically directed to the concept of providing a lightweight, self-contained system which can be quickly and easily activated by a person in need of assistance. System 10 is ideally suited for use by those who participate in outdoor activities, including those who operate watercraft or aircraft, where it is desired to have a lightweight, compact system for summoning aid in the event of an emergency. System 10 is ideally suited for emergency use, since it is easily activated, and once activated is substantially self-deploying.

Referring now to FIG. 1, there is shown system 10 as it might be utilized by a hiker who is lost in the woods. System 10, shown deployed, includes an inflatable bladder 20 tethered by a lanyard cord 50. Of particular importance, is the structure of the inflatable bladder 20 having a portion 22 which is reflective of electromagnetic energy in a visual portion of the electromagnetic spectrum, and having another portion 30 which is reflective of electromagnetic spectrum outside the visual portion of the electromagnetic spectrum. In particular, the portion 22 is reflective of light energy in the bandwidths defined by high visibility colors, such as a fluorescent red. While the portion 30 is formed by a metallic film which is reflective of energy in the radiofrequency spectrum, and therefore capable of providing a radar image which can be utilized to locate the lost individual utilizing system 10. Thus, radiofrequency signals 100 from airborne, or shipborne radar units, upon impinging the reflective metallic layer 30 of inflatable bladder 20 are reflected, providing reflected signals 110 to be received by the search radar system.

Referring to FIG. 2, there is shown inflatable bladder 20 and the inflation assembly 25. Inflatable bladder 20 may be constructed so as to have a first reflective portion 22, 24, the first reflective portion being reflective within the visual bandwidth of the electromagnetic spectrum. A second reflective portion 30, formed of a metallic film, is provided for reflecting electromagnetic energy outside that defined by the first portions 22, 24. Although the precise locations of the first and second portions 22, 24 and 30 may be varied without departing from the inventive concept, applying the metallic film to an equatorial portion of the inflatable bladder maximizes the reflective surface area presented to an incoming radiofrequency signal.

Figure 6:
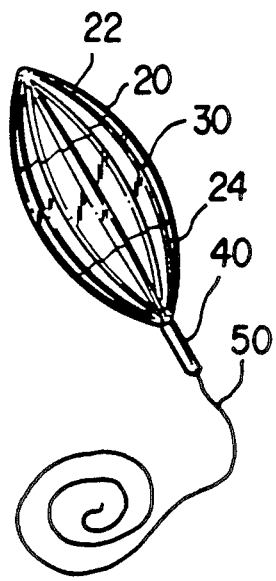
FIG. 6 is a depiction of a deflated balloon embodiment of the signaling system; and, FIG. 7 is a sectional view of the inflation assembly for the signaling system.

Referring to FIG. 6, there is shown one embodiment for the inflatable bladder 20, wherein the bladder is formed of an elastic material having predetermined pigmentation or a coating layer to provide the high visibility reflective portions 22, 24. In the uninflated state, as shown, the inflatable bladder has an undulating contour defined by a plurality of ridges and valleys radiating from the central axis of the bladder. The reflective portion 30 is formed by a metallic film, such as an adhesive backed film which is applied to the elastic bladder material to form a substantially continuous annulus subsequent to inflation of bladder 20. Alternately, the adhesive backed metallic film may be applied as a plurality of separate segments, thereby allowing for expansion of the elastic substrate when the bladder 20 is inflated.

Otherwise, the bladder 20 may be formed of a metallic coated Mylar film such that the bladder 20, shown in FIG. 2, is relfective of radiofrequency signals over its entire surface area, with the high visibility portions 22, 24 being formed by a coating applied thereon. Since the entire surface of bladder 20 is reflective of radiofrequency signals, system 10 could be constructed without the separately defined portion 30, however, by providing a portion 30 devoid of the pigmentation applied to portions 22, 24, such provides for a reflective surface which may be utilized in cooperation with laser range finding equipment. The ability to use laser range finding equipment in combination with system 10 better enables a rescue party to locate the user of system 10.

Figure 7:
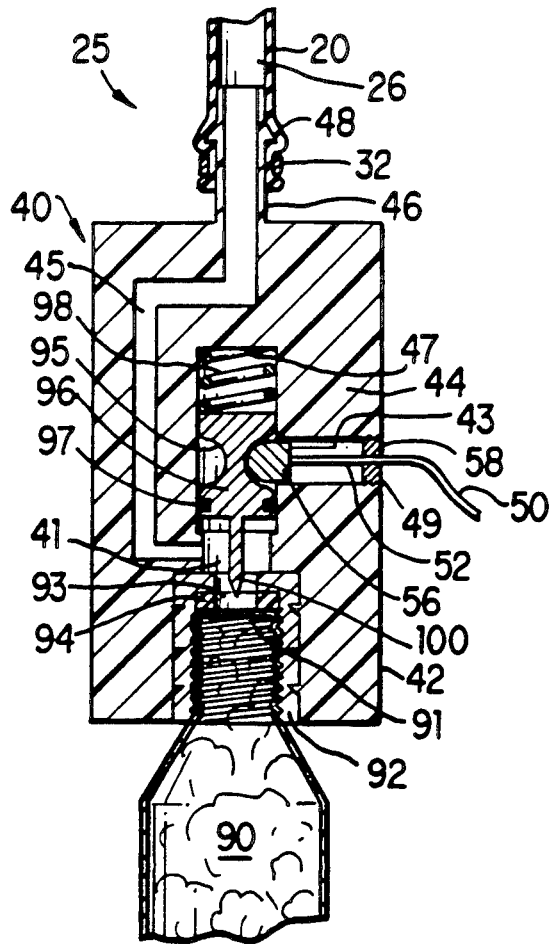

Referring now to FIG. 7, there is shown inflation assembly 25 including an actuator and cartridge assembly 40 coupled to a portion of the inflatable bladder 20 to provide fluid communication between the gas cartridge 90 and the opening 26 formed in inflatable bladder 20. The actuator and cartridge assembly 40 includes a valve assembly 42 comprising a valve body 44 having an integrally formed nipple portion 46 formed thereon. Valve body 44 is formed of a plastic material composition, and includes a metal insert sleeve 92 permanently mounted therein, sleeve 92 having internal threads for receiving the threaded neck portion of the gas cartridge 90. Such valve manifold structures are well known in the art, as exemplified by the inflation manifold system disclosed in U.S. Pat. No. 3,809,288, incorporated herein by reference. Gas cartridge 90 is formed with a soft metal seal disposed at the end portion 91, adapted to be pierced by the piercing needle 100 operating through the gas outlet opening 93 of the insert 92. Gas cartridge 92 is threadedly coupled to valve body 44 by means of the threaded insert 92 and in fluid sealing relationship therewith by means of the elastomeric annular seal 94 disposed between the end 91 of cartridge 90 and the interior end of the insert 92.

Piercing needle 100 is coupled to, or alternately formed integrally with, the needle plunger 96 disposed within the longitudinal bore 41 of valve body 44. Longitudinal bore 41 extends from the gas outlet opening 93 of insert 92 to a closed end 47. A compression spring 98 is disposed between closed end 47 and the needle plunger 96, the initial position of plunger 96 being such that compression spring 98 is in a compressed state for applying a biasing force thereto. Plunger 96 is maintained in this initial position by means of the release pin 56 which is coupled to the first end 52 of the lanyard cord 50. Release pin 56 is disposed within a transverse bore 43 and interfaces with the plunger 96 within an annular groove 95. Transverse bore 43 extends from longitudinal bore 41 to an external opening 49. External opening 49 is internally threaded for receiving a stop plug stop 58 having external threads for securement within opening 49. Stop plug 58 has an opening formed therein of a predetermined size to allow the lanyard cord 50 to pass therethrough, while preventing passage of the release pin 56. This arrangement allows the lanyard cord 50 to be utilized as a tether for the inflated bladder, subsequent to displacement of the pin 56 from the annular groove 95.

The pin 56 is disengaged from the annular groove 95 by a pull force applied to the lanyard cord 50. Removal of the pin 56 from the annular groove 95 permits the spring 98 to drive the plunger 96 toward the gas cartridge 90, the piercing needle 100 puncturing the soft metal seal of cartridge 90, releasing the compressed gas therefrom. Gas cartridge 90 contains a lighter-than-air gas, preferably helium, although hydrogen, or the like may be utilized. The pressure of the gas contained within cartridge 90 displaces the plunger 96 sufficiently to allow the gas to exit the outlet 93 and enter the longitudinal bore 41. The length of spring 98 has been predetermined to allow a limited displacement of plunger 96 by the pressure of the gas before contact is made therebetween. Plunger 96 is provided with an "O" ring seal 97 to prevent the escape of the released gas from the longitudinal bore into the transverse bore. The gas released from the cartridge 90 is coupled to the nipple 46 by means of a gas channel 45 which is fluidly coupled to the longitudinal bore adjacent the gas outlet 93 of the insert 92.

Inflatable bladder 20 is coupled to the nipple 46, the connecting portion of bladder 20 being extended over nipple 46, nipple 46 having at least one annular barb 48 over which the bladder extends. Bladder 20 is further secured to nipple 46 by a coupling band 32, which may be a plastic tie wrap device, well known in the art, overlaying both the connecting portion 20 and nipple 46. Thus, it can be seen that by simply tugging on lanyard cord 50 the inflation of inflatable bladder 20 can be triggered, the lanyard cord 50 being retained within the valve body 44 by means of the threaded stop plug 58, allowing the lanyard cord to then serve as a tether for maintaining the inflated signaling balloon at a predetermined altitude, at least 10 feet, with respect to the user's position.

Referring now to FIG. 3, there is shown the storage case 60 for housing the reflective inflatable bladder 20 and inflation assembly 25 within the cavity defined by the walls of case 60. Access to the interior of case 60 is provided by a closure flap 62 hingedly coupled to an adjacent wall. In a preferred embodiment, case 60 is formed of a flexible waterproof material 61, or a combination of materials laminated together to form the waterproof case 60. Closure flap 62 defines a substantial portion of the front face of case 60, overlapping the top edge 63 of the case frontal wall 67.

Case 60 is coupled to the user's body in any one of several ways. Case 60 is provided with a pair of straps 66, secured one to the other by means of a buckle, or other similar coupling 68, such as a hook and loop type fastener. The straps 66 may be slung over the user's shoulder, or coupled about the user's waist. Additionally, case 60 includes a latching hook 65 coupled to the terminus of one of the straps 66, allowing case 60 to be clipped onto the user's clothing, or an accessory, such as a backpack.

Securement of case 60 about the user's waist by means of straps 66 and coupling 68 is highly advantageous to the user. Using straps 66 as a waist belt allows the user's hands to be free to engage in other activities, without concern about the ability to activate system 10, when needed. The coupling of case 60 to the user's waist permits the user's hands to be free, even subsequent to deployment of inflatable bladder 20, since bladder 20 is tethered to case 60 by lanyard cord 50, as will be described in following paragraphs.

Closure flap 62 is secured to the front wall 67 by means of a releasable coupling 64, such as a hook-and-loop type fastener. However, the coupling force of the securement device 64 has been predetermined such that the forces exerted on the closure flap 62 by the inflation of bladder 20, during the inflation process, is sufficient to release the closure flap, and permit the self-deployment of the reflective balloon. This is accomplished by either limiting the size of the hook-and-loop elements, or utilizing a hook fastening element having a reduced density, thereby reducing the holding force of the coupling.

To further aid in the self-deployment of the inflated bladder 20, case 60 is provided with a cord storage assembly 70 wherein the lanyard cord 50 is wrapped about a pin such that it is easily unwound as the inflated bladder ascends from the storage case. Cord storage assembly 70, shown in FIGS. 4 and 5, includes a bracket 72 fixedly coupled to the case material 61. Bracket 72 is coupled to the case material 61 by means of a back plate 78 and at least a pair of rivets 74. Rivets 74 secure the back plate 78 to bracket 72, sandwiching the material 61 therebetween. Although two rivets 74 are shown, the number or type of fastener is not important to the inventive concept, bracket 72 may be coupled to a wall of case 60 by any means.

Bracket 72 may be formed of a metal or plastic material composition, and includes a through opening 76 formed therein for coupling the second end 54 of lanyard cord 50 thereto. Through opening 76 is sized to allow the passage of lanyard cord 50 therethrough, wherein the second end 54 of the lanyard cord can be knotted or fitted with a fastener to securely tether the balloon to the user through the storage case 60. Bracket 72 further includes a spindle 80 extending transversely from a portion of bracket 72 to allow cord 50 to be wrapped thereon. Spindle 80 and bracket 72 are sized to permit up to 100 feet of lanyard cord 50 to be stored.

With bladder 20 and the inflation assembly 25 being stored within storage case 60, and the closure flap 62 releasably secured to the front wall 67, the lanyard cord 50 passes through the interface between the closure flap 62 and the adjacent side wall, the material 61 being sufficiently flexible to allow the passage of cord 50 therebetween. Cord 50 is wrapped about the spindle 80 of cord storage assembly 70 such that a loop of cord remains between the spindle 80 and the interface between the closure flap 62 and the adjacent wall between which the cord 50 enters case 60. This loop portion 51 is thereby available for the user to apply the necessary force for activating the release of the compressed gas from the cartridge 90. Once the release of the compressed gas has been triggered, the inflatable bladder 22 begins to expand, applying sufficient force to release the coupling between the securement elements 64, allowing the flap 62 to be displaced from the front wall 67 by the expansion of bladder 20, thereby permitting the bladder to ascend from the storage case 60 while being tethered by the lanyard cord 50 which is unwound from the cord storage assembly 70, to which it is secured.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit of scope of the invention as defined in the appended claims.

What is claimed is:

1. An emergency signaling system, comprising:

reflective signal means for substantially simultaneously reflecting electromagnetic energy in two distinct bandwidths of the electromagnetic spectrum subsequent to inflation thereof, a first of said two bandwidths being within a visual portion of the electromagnetic spectrum and a second of said two bandwidths being external said visual portion of the electromagnetic spectrum;

means for inflating said reflective signal means to a predetermined volume with a gas composition having a density less than air, said inflating means being coupled to said reflective signal means, said inflating means including actuator means for releasing said gas composition responsive to a manual operation, said actuator means including valve means sealingly coupled to a portion of a cartridge for releasing said gas composition stored in a compressed state responsive to said manual operation, said valve means including a piercing member releasably secured against a spring bias by a release member, said piercing member being displaced by said spring bias to puncture said cartridge and thereby release said gas composition to said reflective signal means responsive to said manual operation displacing said release member from a first position to a second position;

a lanyard cord member having a first end coupled to said release member for (1) displacing said release member responsive to said manual operation applying a pulling force to said lanyard cord member, and (2) tethering said inflated reflective signal means a predetermined height above a ground level; and, storage means for housing said reflective signal means and said inflating means, said storage means including a housing having a cavity therein for receiving said reflective signal means and said inflating means, said housing having a wall hingedly coupled to a rear wall of said housing for forming a closure for said cavity, said hinged wall interfacing with at least one flexible wall, said flexible wall being sufficiently pliant for said lanyard cord member to extend external said housing from said cavity through said interface, said storage means including means for spooling said lanyard cord member coupled to an external surface of said housing, said lanyard cord member having a second end coupled to said spooling means.

2. The emergency signaling system as recited in claim 1 where said reflective signal means includes an inflatable bladder member having an opening formed therein, said opening being coupled to said inflating means.

3. The emergency signaling system as recited in claim 2 where said inflatable bladder has a first surface portion reflective of electromagnetic radiation in said first bandwidth.

4. The emergency signaling system as recited in claim 3 where said reflective signal means further includes a metallic reflector coupled to a second surface portion of said inflatable bladder for reflecting electromagnetic radiation in said second bandwidth.

5. The emergency signaling system as recited in claim 2 where said inflatable bladder is formed from a material composition having a metallic film formed thereon for reflecting electromagnetic radiation in said second bandwidth.

6. The emergency signaling system as recited in claim 5 where said reflective signal means further includes a coating layer formed on a at least one surface portion of said inflatable bladder for reflecting electromagnetic radiation in said first bandwidth.

7. The emergency signaling system as recited in claim 1 where said spooling means includes a spindle member coupled to and extending from a bracket member, said bracket member having a through opening formed therein for coupling said lanyard cord member second end thereto.

8. The emergency signaling system as recited in claim 1 where said storage means includes securement means coupled to said cavity closure and one other wall of said housing for providing a releasable coupling therebetween, said coupling being releasable responsive to inflation of said reflective signal means.

9. An emergency signaling system, comprising:

an inflatable bladder having a fluid receiving opening formed therein;

inflation means coupled to said fluid receiving opening of said bladder for transferring a gas composition stored in a cartridge to said bladder, said inflation means including (1) an actuator means for releasing said gas composition responsive to a manual operation, (2) a lanyard cord member having a first end coupled to said actuator means for applying a pull force thereto by said manual operation and defining a tether for said inflatable bladder;

a flexible walled housing having a cavity for storing said inflatable bladder and said inflation means, said housing having a hinged wall defining a closure for said cavity;

means for paying out said lanyard cord member coupled to an external surface of said housing and being coupled to a second end of said lanyard cord member, said paying out means including a bracket member coupled to said housing.

10. The emergency signaling system as recited in claim 9 where said paying out means further includes a spindle member coupled to said bracket member and extending substantially orthogonal therefrom, said lanyard cord member being wrapped about said spindle member for storage thereon.

11. The emergency signaling system as recited in claim 9 where said inflatable bladder is formed of a material composition reflective of electromagnetic energy in a first bandwidth of the electromagnetic spectrum.

12. The emergency signaling system as recited in claim 11 further comprising a reflective member coupled to a portion of said inflatable bladder, said reflective member being reflective of electromagnetic energy in a second bandwidth of the electromagnetic spectrum.

13. The emergency signaling system as recited in claim 9 where said gas composition is helium.

14. The emergency signaling system as recited in claim 9 where said lanyard cord member has a length dimension of at least 10 feet.

* * * * *